United States Patent [19]
Jorritsma

[11] Patent Number: 4,821,580
[45] Date of Patent: Apr. 18, 1989

[54] METHOD AND APPARATUS FOR CALCULATING FLOW RATES THROUGH A PUMPING STATION

[76] Inventor: Johannes N. Jorritsma, 37 Yonge Street N., Aurora, Ontario, Canada, L4G 1N6

[21] Appl. No.: 148,875
[22] Filed: Jan. 27, 1988
[51] Int. Cl.$^4$ ............................................. G01F 1/34
[52] U.S. Cl. ............................ 73/861; 73/861.42; 73/168
[58] Field of Search ............ 73/168, 223, 861, 861.42; 364/510

[56] References Cited

U.S. PATENT DOCUMENTS

| | | | |
|---|---|---|---|
| 3,292,428 | 12/1966 | Motl | 73/168 |
| 3,350,934 | 11/1967 | Orkney et al. | 73/168 |
| 4,455,870 | 6/1984 | Jorritsma | 73/861 |
| 4,467,657 | 8/1984 | Olsson | 73/861 |

*Primary Examiner*—Herbert Goldstein
*Attorney, Agent, or Firm*—Sim & McBurney

[57] ABSTRACT

For a pumping station having a pump, a method is provided for calculating the flow rate, which includes the storage in a computer memory of a table correlating pumping rate for the pump with the pressure differential across the pump. Data is detected from which the differential pressure across the pump can be computed, and then a computer is utilized firstly to compute the differential across the pump, then to access the table in the memory to determine the pumping rate corresponding with the computed pressure differential, then to calculate the volume pumped during the time interval, then updating a totalizer in the memory by adding in the calculated volume.

18 Claims, 2 Drawing Sheets

METHOD AND APPARATUS FOR CALCULATING FLOW RATES THROUGH A PUMPING STATION

This invention relates generally to a method and apparatus for calculating flow rates through a pumping station, and has to do particularly with a method and apparatus for accurately determining the rate at which sewage and the like is pumped through a pumping station in a sewage handling system

BACKGROUND OF THIS INVENTION

In my previous U.S. Pat. No. 4,455,870, issued on June 26, 1984, a means is provided to measure flow through a pumping station utilizing constant speed pumps which cycle on and off. Typically, a pump will start pumping when the wet well reaches a "high" level, and will cease pumping when the wet well reaches a "low" level.

There are pumping stations where the system set forth in my above U.S. patent cannot be used, because the pumping stations utilize variable speed pumps. In such systems, so long as sewage is coming into the pumping station, at least one pump is running, although this may be at a low rate of speed. In stations utilizing variable speed pumps, the aim is to get the sewage or water moving out of the station at about the same rate as it comes in. This is accomplished by continuously adjusting the speed of the pump or pumps so as to maintain a given level in the wet well.

In these systems, the method for level detection is usually either ultrasonic or the bubbler type (based on pressure). As the level in the wet well tends to rise, the speed of the pump is increased, and this is normally accomplished by using a frequency control device. Conversely, when the level in the wet well goes down, the speed of the pump decreases.

Conventionally, liquid flow through a pumping station with a variable speed pump or pumps is measured by a magnetic flow meter or an open channel flow meter at the inlet to the wet well. However, these methods leave much to be desired in terms of accuracy.

GENERAL DESCRIPTION OF THIS INVENTION

Generally, this invention aims to improve the accuracy of measurement of the flow rate through a pumping station utilizing a variable speed pump or pumps. This is accomplished by using a computing device which incorporates a memory means in which is stored a table correlating the pumping rate for the pump with the pressure differential across the pump. This process is applicable not only to variable speed pumps, but to the "limit case" of a variable speed pump, which is of course a constant speed pump. The computing device incorporates means for detecting the pressures both upstream and downstream of the pump, and thus can compute the differential across the pump by subtracting one from the other. The table in the memory means is then accessed in order to determine the pumping rate corresponding with the computed pressure differential, and then the volume pumped is calculated. With this calculated volume, a totalizer in the memory means is updated.

More specifically, this invention provides a method of calculating the flow rate through a pumping station having a pump, comprising the steps:

(a) storing in a memory means a table correlating pumping rate for the pump with the pressure differential across the pump, (b) detecting data from which the differential pressure across the pump can be computed, (c) utilizing a computing means to accomplish the following at sequential points of time:

(i) compute the differential across the pump on the basis of said data, (ii) access said table in the memory means in order to determine the pumping rate corresponding with the computed pressure differential, (iii) calculate the volume pumped during the time interval between the current time point and the immediately preceding time point by multiplying the determined pumping rate by the length of the time interval, and (iv) update a totalizer in the memory means by adding in the calculated volume pumped during the respective interval Further, this invention provides, in combination:

a pumping station having a wet well, a liquid inflow to the wet well, a pump, a connection from the suction side of the pump to the wet well, and an outflow conduit connected to the high-pressure side of the pump, memory means storing a table correlating pumping rate for the pump with the pressure differential across the pump, sensing means for detecting data on the basis of which the pressure differential across the pump can be computed, and computing means adapted to accomplish the following at sequential points of time:

(i) compute the pressure differential across the pump on the basis of said data, (ii) access said table in the memory means in order to determine the pumping rate corresponding with the computed pressure differential, (iii) calculate the volume pumped during the time interval between the current time point and the immediately preceding time point by multiplying the determined pumping rate by the length of the time interval, and (iv) update a totalizer in the memory means by adding in the calculated volume pumped during the respective interval Still further, this invention provides a method of calculating the flow rate through a pumping station having at least one pump, comprising the steps:

(a) providing for each pump and for each combination of pumps an oscillator circuit of which the output frequency may be adjusted, (b) adjusting the output frequency of each oscillator circuit to represent the pump rate for the pump or pump combination to which that oscillator circuit corresponds, (c) while operating the pumping station, feeding to a totalizing device the output frequency of that oscillator circuit which corresponds to the pump or combination of pumps which is operating at any given time, (d) incrementing the total in the totalizer by a given amount for each pulse encountered, whereby the totalizer is continuously updated.

GENERAL DESCRIPTION OF THE DRAWINGS

The invention will now be described with the aid of the accompanying drawings, in which.

DETAILED DESCRIPTION OF THE DRAWINGS

This invention will be described first in connection with the use of a constant speed pump or pumps, and then in connection with the use of a variable speed pump or pumps.

Constant Speed Pumps

Figure 2:
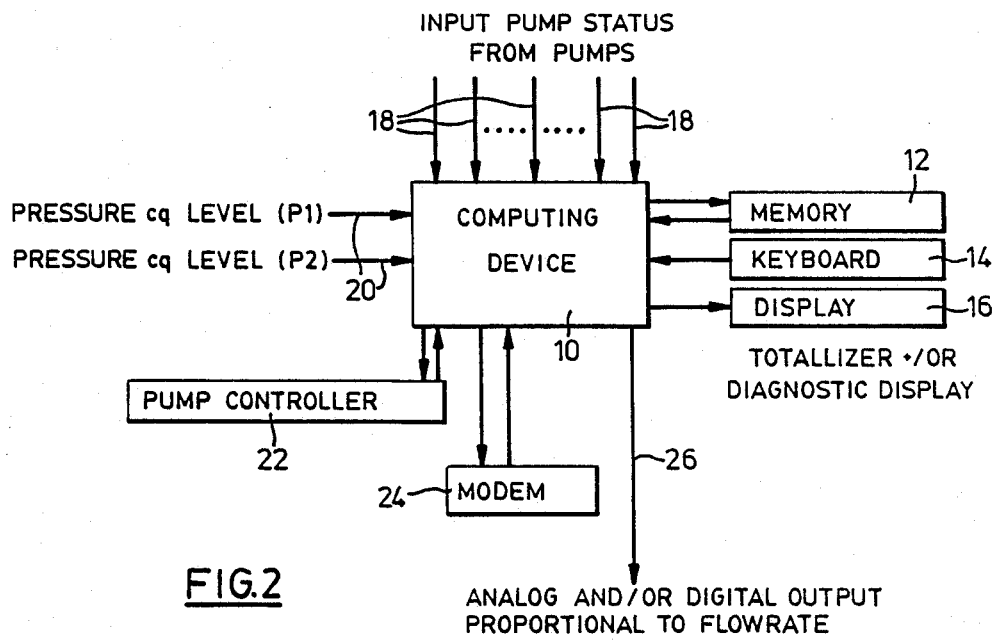
FIG. 2 is a block diagram showing the major components of the computing system.

Attention is first directed to FIG. 2, which shows a computing device 10 with connections to a memory 12, a keyboard 14 and a display 16. The computing device 10 also receives inputs 18 to indicate the pump status (on or off in the case of a constant speed pump), and inputs 20 which provide information about the pressure differential across the or each pump. The computing device 10 also interfaces, if necessary, with a pump controller 22 and a modem 24. Also if desired, a separate output 26 may be provided, which is proportional to the flow rate and is in analog or digital form.

Figure 1:
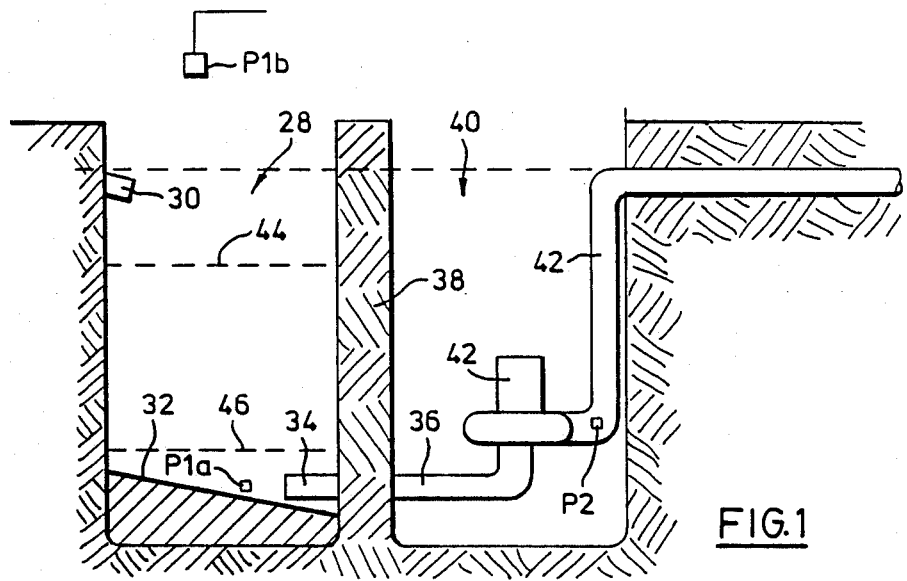
FIG. 1 is a vertical sectional view, shown somewhat schematically, through a pumping station which includes a wet well and a pump.

Attention is now directed to FIG. 1, which shows a wet well 28 which receives sewage or liquid through an inlet conduit 30. The wet well 28 has a sloping bottom 32 to ensure that all materials entering the wet well will tend to migrate to one particular location In that location is the intake end 34 of a suction conduit 36 passing through a partition 38 to a pump chamber 40. In the pump chamber 40 is a pump 42 which delivers pumped sewage or liquid to an output conduit 42. A sensor P2 is located immediately downstream of the pump 42, and senses the back pressure which is seen by the pump. The pressure at the suction side of the pump 42 can be calculated on the basis of the level of sewage in the wet well 28, and therefore a sensing means can be provided to simply determine the level of the contents of the wet well 28. This may be done by providing a pressure sensor P1at the bottom of the wet well 28, operating, for example, on the bubbler principle, or alternatively it can be accomplished by providing an ultrasonic sensor P1*b* above the highest level of sewage in the wet well 28, the sensor P1*b* being adapted, at regular intervals, to emit an ultrasonic signal, which bounces off the surface of the liquid and then is received again at the sensor P1*b*. The lapse of time between sending and receiving can be calculated and used to determine the level of liquid in the wet well 28. Normally, sensors such as that shown at P1*b* provide a first electronic signal when the ultrasonic burst is sent, and a second electronic signal when the echo is received. A conventional analog to digital converter can then be used to convert the lapse of time between the electronic signals to a specific number, which can then be fed to the computing device.

Contained in the memory 12 is a look-up table (the equivalent of a curve) which describes the pump capacity versus the differential pressure across the pump, which is usually referred to as relative head height. The table in the memory can be based on the pump capacity curve usually supplied by a manufacturer for a given pump, or alternatively it can be empirically established by running a series of tests at different specific pressure differentials. Such empirically established data can be produced by a "calibration run" during which the pump or pumps are operated manually or in accordance with a pre-set program in the computing device The computing device controls a running total in the memory 12, which may be called a totalizer, and this total is updated on a regular basis by the computing device 10. Of course, the computing device 10 only needs to update the totalizer when one or more pumps are running.

In operation, assuming that the wet well 28 is continuously receiving sewage at a variable rate, and that the pump 42 is cycling on and off, turning on when the liquid level in the wet well reaches a predetermined upper limit 44 and turning off when the level reaches a predetermined lower limit 46, the computing device 10 carries out the following steps:

Firstly, the pressure upstream of the pump 42, as indicated by the sensor P2, and the pressure downstream of the pump 42, based on the level of liquid in the wet well 28, are both determined at a given point in time. From this data, the computing device 10 derives the pressure differential across the pump 42, and then consults the table in the memory 12 to learn the pumping rate for the pump. The computing device 10 then calculates the volume pumped during the time interval between the current time point and the immediately preceding time point by multiplying the determined pumping rate by the length of the time interval. Finally, the totalizer in the memory 12 is updated by adding in the calculated volume pumped during the respective interval.

This same sequence of computations is carried out at sequential points of time, which may be either at equal intervals, as initiated by a timer function incorporated into the computer, or on the basis of a change in pump status and/or a change in the pressure differential that is greater than a predetermined amount. Again, when the pump is not running, a separate function would override and cancel the computation.

In the event that the pumping station has a plurality of constant speed pumps, the memory 12 would store, for each pump, a table representing or correlating pumping rate with respect to pressure differential, and the computing device would accomplish the various calculations for each pump. Normally, when plural pumps are provided, the level of sewage in the wet well is controlled by phasing in the pumps one after the other, as needed. Thus, there will be a lead or first pump which would operate whenever pumping is called for. A second pump could be phased in only when the lead pump is not able to cause the liquid level to descend. A third pump may also be provided, and so on.

Figure 3:
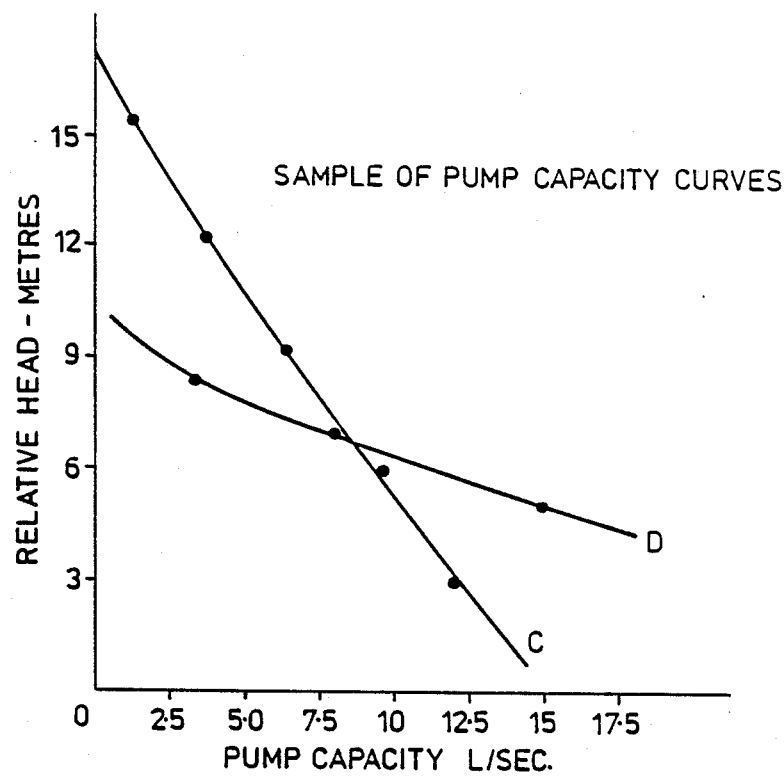
FIGS. 3 and 4 are representative graphs showing various pump capacity curves.

FIG. 3 is a typical graph showing pumped capacity versus relative head height for two different pumps C and D.

Variable Speed Pumps

Figure 4:
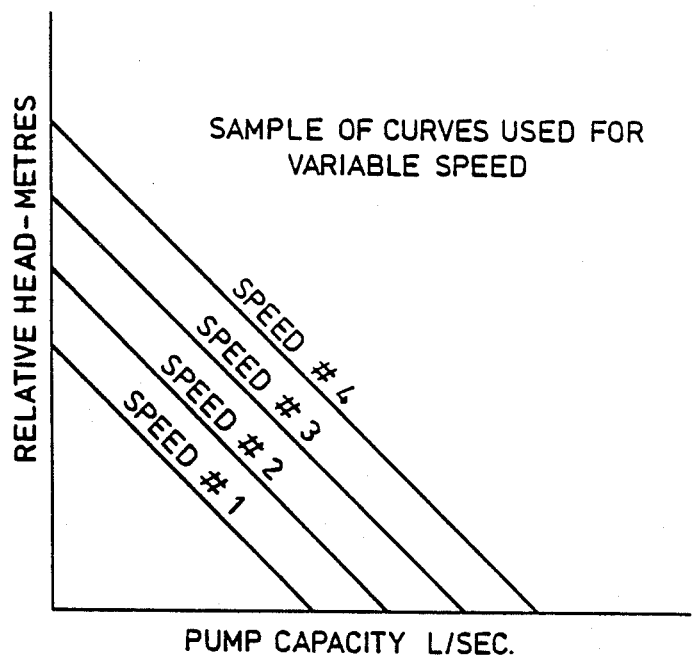

The system described above can readily be re-configured for variable speed pumps, so that the inputs become analog or digital inputs of pump speeds. A zero pump speed indication would show that a pump was off. With a variable speed pump, there are two variables affecting pumping capacity: the actual speed of the pump and the head against which the pump is working. This would mean that the memory 12 would need to store a family of curves or the equivalent data tables such as the curves shown in FIG. 4. This would be done for each pump in the case where more than one pump were provided. As previously, the summation of the pump capacities of the pumps which are running would be used to update a totalizer, indicating the total outflow.

It will be evident that an installation which includes a variable speed pump and a constant speed pump (or more than one of each) could also be handled by the system under discussion. The computer would simply distinguish between the pumps, and look up the necessary information in the memory 12 prior to making the computations.

It is contemplated that the computing system illustrated in FIG. 2 could be used as a total pump station controller. For example, a community might have from ten to fifty pumping stations, and these pumping stations all pump into a single force-main which runs to the treatment plant. In a conventional system, the pumping stations would all start and stop at random, as determined by the inflow into the respective wet wells. It often happens, with a conventional system, that some pumps will start to pump against each other, producing a particularly high back-pressure and a low pump capacity In the system contemplated herein, a central or master computer would receive all the data from the individual stations, and would schedule the pump cycles at each station to even out the flow as much as possible and reduce to a minimum the overlap of pump cycles. For example, if many stations are predicting the same start time for their emptying cycles, then the central or master computer would start a few pumping stations prematurely to avoid the "rush hour" effect.

It is pointed out that, as earlier mentioned briefly, the periodic computations may be made on a level or pressure incremental basis, representing a system which only corrects the outflow rate when there is a change in pump status (i.e. a change in the number of pumps pumping) or a significant change in the upstream and downstream pressure signals. The change in pump status would also include a significant change in the speed of a variable speed pump.

Continual Up-dating

A variant of the system described above is one in which a totalizer can be up-dated continually, rather than at timed intervals. In such a system, there would be provided a multiplicity of channels, one for each pump and each combination of pumps. Each channel would incorporate an oscillator circuit and a variable resistance forming part of that oscillator circuit would turn the circuit into an adjustable analog memory means The frequency of any given circuit is adjusted, by means of the variable resistance, so that it correlates with or represents the pumping rate for the pump or pump combination to which that particular oscillator circuit corresponds. Then, when the pumping station is being operated, the number and identity of the pumps pumping is determined, which in turn determines the channel to be accessed The particular frequency of that channel is then fed to a totalizer which accepts the input frequency. The totalizer increments its display by a given amount (for example unity) for each pulse encountered. In this manner, the totalizer can be up-dated continually.

A central computer can handle this entire operation, by receiving inputs from the "pump on" detectors. A look-up function would allow the computer to know which channel to reference for each combination of pumps or each individual pump.

Special Case

When the output from a pumping station feeds into a gravity feed system, for example after rising from the pump outlet level to the level of the outflow into the gravity feed system, then the back pressure will remain substantially constant, being the head represented by the weight of water between the two levels. This ignores the effect of friction, but for large pipes this is relatively small. In this special case, variations in the differential pressure across the pumps is due only to the variation of the liquid level in the wetwell. For pumps with "steep" pump curves in which there is little variation of pump capacity with small variations in differential pressure, an average pump capacity may be picked for each pump, thereby reducing the input variables to the bare minimum of pump status (i.e., which combination of pumps are running and/or the speed of the pumps). If the pump capacity is more "shallow", then the level in the wetwell has a more pronounced effect on the outflow rate. In this event, a more accurate calculation of the effective pump capacity would necessarily include the wetwell level or pressure as a variable in the pump capacity look-up table While one embodiment of this invention has been illustrated in the accompanying drawings and described hereinabove, it will be evident to those skilled in the art that changes and modifications may be made therein, without departing from the essence of this invention as set forth in the appended claims.

The embodiments of the invention in which an exclusive property or privilege is claimed are defined as follows:

1. A method of calculating the flow rate through a pumping station having a pump, comprising the steps:
   (a) storing in a memory means a table correlating pumping rate for the pump with the pressure differential across the pump,
   (b) detecting data from which the differential pressure across the pump can be computed,
   (c) utilizing a computing means to accomplish the following at sequential points of time:
      (i) compute the differential across the pump on the basis of said data,
      (ii) access said table in the memory means in order to determine the pumping rate corresponding with the computed pressure differential,
      (iii) calculate the volume pumped during the time interval between the current time point and the immediately preceding time point by multiplying the determined pumping rate by the length of the time interval, and
      (iv) update a totalizer in the memory means by adding in the calculated volume pumped during the respective interval.

2. The invention claimed in claim 1, in which the sequential points of time are at equal intervals, and in which a timer function automatically initiates the computations by the computing means.

3. The invention claimed in claim 2, in which the pumping station has a plurality of pumps, and in which said memory means stores, for each pump and each combination of pumps, a table correlating pumping rate with pressure differential, the computing means accomplishing step c) for each pump or combination.

4. The invention claimed in claim 2, in which the pump is a variable speed pump, the memory means storing sufficient data to allow computation of the pumping rate for a range of pumping speeds and a range of pressure differentials.

5. The invention claimed in claim 3, in which the pumps are variable speed pumps, the memory means storing sufficient data to allow computation, for each pump, of the pumping rate for a range of pumping speeds and a range of pressure differentials.

6. The invention claimed in claim 1, in which the sequential points of time are determined by changes in the pressure differential that are greater than a predetermined amount.

7. The invention claimed in claim 6, in which the pumping station has a plurality of pumps, the sequential points of time being also determined by a change in the number of pumps in operation, and in which said memory means stores, for each pump, a table correlating pumping rate with pressure differential, the computing means accomplishing step c) for each pump.

8. The invention claimed in claim 6, in which the pump is a variable speed pump, the sequential points of time being also determined by a change in speed of the pump which is greater than a predetermined amount, the memory means storing sufficient data to allow computation of the pumping rate for a range of pumping speeds and a range of pressure differentials.

9. The invention claimed in claim 7, in which the pumps are variable speed pumps, the sequential points of time being also determined by a change in speed of any pump which is greater than a predetermined amount, the memory means storing sufficient data to allow computation, for each pump, of the pumping rate for a range of pumping speeds and a range of pressure differentials.

10. In combination:
   a pumping station having a wet well, a liquid inflow to the wet well, a pump, a connection from the suction side of the pump to the wet well, and an outflow conduit connected to the high-pressure side of the pump,
   memory means storing a table correlating pumping rate for the pump with the pressure differential across the pump,
   sensing means for detecting data on the basis of which the pressure differential across the pump may be computed,
   and computing means adapted to accomplish the following at sequential points of time:
   (i) compute the pressure differential across the pump on the basis of said data,
   (ii) access said table in the memory means in order to determine the pumping rate corresponding with the computed pressure differential,
   (iii) calculate the volume pumped during the time interval between the current time point and the immediately preceding time point by multiplying the determined pumping rate by the length of the time interval, and
   (iv) update a totalizer in the memory means by adding in the calculated volume pumped during the respective interval.

11. The invention claimed in claim 10, in which the sequential points of time are at equal intervals, and in which a timer function automatically initiates the computations by the computing means.

12. The invention claimed in claim 11, in which the pumping station has a plurality of pumps, and in which said memory means stores, for each pump, a table correlating pumping rate with pressure differential, the computing means accomplishing step c) for each pump.

13. The invention claimed in claim 11, in which the pump is a variable speed pump, the memory means storing sufficient data to allow computation of the pumping rate for a range of pumping speeds and a range of pressure differentials.

14. The invention claimed in claim 12, in which the pumps are variable speed pumps, the memory means storing sufficient data to allow computation, for each pump, of the pumping rate for a range of pumping speeds and a range of pressure differentials.

15. The invention claimed in claim 10, in which the sequential points of time are determined by changes in the pressure differential that are greater than a predetermined amount.

16. The invention claimed in claim 15, in which the pumping station has a plurality of pumps, the sequential points of time being also determined by a change in the number of pumps in operation, and in which said memory means stores, for each pump, a table correlating pumping rate with pressure differential, the computing means accomplishing step c) for each pump.

17. The invention claimed in claim 15, in which the pump is a variable speed pump, the sequential points of time being also determined by a change in speed of the pump which is greater than a predetermined amount, the memory means storing sufficient data to allow computation of the pumping rate for a range of pumping speeds and a range of pressure differentials.

18. The invention claimed in claim 16, in which the pumps are variable speed pumps, the sequential points of time being also determined by a change in speed of any pump which is greater than a predetermined amount, the memory means storing sufficient data to allow computation, for each pump, of the pumping rate for a range of pumping speeds and a range of pressure differentials.

* * * * *